United States Patent [19]

Schwartzman

[11] 4,023,946

[45] * May 17, 1977

[54] RECTIFICATION SYSTEM FOR THE SEPARATION OF FLUIDS

[76] Inventor: Everett H. Schwartzman, 724 Cloyden Road, Palos Verdes Estates, Calif. 90274

[ * ] Notice: The portion of the term of this patent subsequent to Mar. 4, 1992, has been disclaimed.

[22] Filed: Feb. 27, 1975

[21] Appl. No.: 553,538

Related U.S. Application Data

[63] Continuation-in-part of Ser. No. 414,600, Nov. 9, 1973, Pat. No. 3,869,351.

[52] U.S. Cl. .................... 62/40; 62/28; 62/116; 62/191; 62/26; 202/173; 203/26; 60/671; 62/467 PR; 62/31
[51] Int. Cl.[2] ........................... F25J 1/02
[58] Field of Search ............... 62/9, 11, 17, 23, 24, 62/26, 31, 30, 34, 36, 21, 37, 38, 39, 41, 42, 40, 116, 191; 203/26, 24, 11; 202/235, 172, 173; 159/DIG. 32

[56] References Cited

UNITED STATES PATENTS

| 3,091,098 | 5/1963 | Bowers | 159/DIG. 32 |
| 3,194,026 | 7/1965 | LaFleur | 62/38 |
| 3,213,001 | 10/1965 | Schmidt | 159/DIG. 32 |
| 3,243,359 | 3/1966 | Schmidt | 203/26 |
| 3,349,007 | 10/1967 | Ciborowski et al. | 203/26 |
| 3,564,571 | 2/1971 | Yearout | 62/40 |
| 3,837,172 | 9/1974 | Markbreiter et al. | 62/38 |
| 3,856,632 | 12/1974 | Peter | 203/26 |
| 3,869,351 | 3/1975 | Schwartzman | 202/172 |

Primary Examiner—Frank W. Lutter
Assistant Examiner—Frank Sever
Attorney, Agent, or Firm—Mario A. Martella

[57] ABSTRACT

A separation system is disclosed for obtaining pure components from a fluid mixture employing a minimum amount of energy. A rectification column is utilized in which the fluid mixture is separated into its components whereby the heat addition and cooling required is accomplished by means of a heat pump transfer system. The system transfers heat energy to a working fluid to power a compressor structure in a heat pump cycle by supplying heat to the liquid phase. Compressor structure is disclosed in the forms of an ejector and a turbine-powered compressor. As disclosed, the same working fluid is employed in the power cycle and the heat pump cycle. Specific structures are disclosed for obtaining greater efficiency including an arrangement for heat regeneration in the power loop of the heat pump cycle and also disclosed is an arrangement whereby individual systems are staged for the separation of multicomponent mixtures.

14 Claims, 4 Drawing Figures

4,023,946

RECTIFICATION SYSTEM FOR THE SEPARATION OF FLUIDS

RELATED APPLICATION

This application is a continuation-in-part of U.S. application Ser. No. 414,600, filed on Nov. 9, 1973, now U.S. Pat. No. 3,869,351.

BACKGROUND OF THE INVENTION

The separation of fluid mixtures by rectification is one of the largest chemical processes in use. These systems are designed with an economical view toward capital costs relative to operating costs. With the present shortage of energy and the accompanying high cost, however, the necessity of more efficient separation processes is apparent. With this need in mind, the improved efficiency afforded by the disclosed system is the most significant consideration. Other important desirable characteristics are the avoidance of compressor seals, and smaller required components, mainly the re-boiler heat exchanger and reflex condenser. The avoidance of compressor-turbine seals is also a significant consideration as these seals are a perpetual maintenance problem. Generally, the present invention represents a substantial improvement with regard to these considerations.

SUMMARY OF THE INVENTION

The present invention is directed to a system incorporating a power cycle and a refrigeration cycle cooperating to form a heat pump. A common working fluid is employed in both cycles. The power cycle actuates a compressor structure which is an active element in the overall heat pump cycle. The power cycle also supplies heat to the liquid in the re-boiler of the rectification column. The refrigeration cycle extracts heat from the vapor in the re-condensor of the rectification column to produce a re-flux liquid. The present system permits the flexibility to use a fluid of the desired thermodynamic properties as required by the type of separation undertaken which thereby affords improved efficiency and smaller components. Additionally, this system is so implemented that the evaporation (re-boiling) and condensing (refluxing) are accomplished each at their respective required fixed temperatures, so as to approach the optimum system cycle with a high efficiency characteristic. Other advantages will be apparent from a consideration of the system as set forth.

BRIEF DESCRIPTION OF THE DRAWINGS

In the drawings, which constitute a part of this specification, an exemplary embodiment exhibiting various objectives and features hereof is set forth, specifically.

DESCRIPTION OF THE ILLUSTRATIVE EMBODIMENT

As required, detailed illustrative embodiments of the invention are disclosed herein. The embodiments exemplify the invention which may, of course, be constructed in various other forms, some of which may be radically different from those disclosed herein. However, the specific structural details as disclosed herein are currently deemed to represent the best forms, within that objective, and furthermore effectively provide a basis for the claims which define the scope of the present invention.

Figure 1:
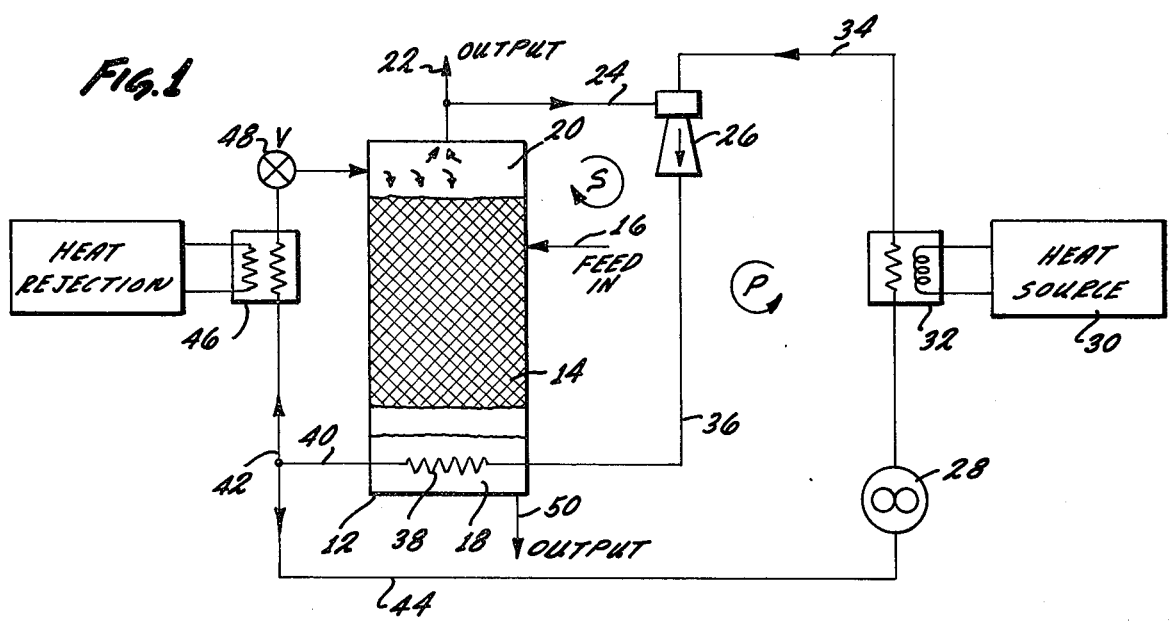
FIG. 1 is a schematic diagram of one system constructed in accordance with the present invention relating in its most elementary form.

Referring initially to FIG. 1, a system is illustrated involving a power cycle or loop P (right) and a separation cycle or loop S (left). As indicated above, common working fluid (in this exemplar consisting of the composition of the top output fluid) circulates in the two loops P and S.

Considering the system of FIG. 1 in somewhat greater detail, a vessel or tank 12 containing appropriate packing 14 such as Raschig rings, or the like, distributes an incoming fluid mixture 16 so that the liquid portion thereof flows downwardly to the re-boiler section 18 while the vapor portion of the feed flows upwardly to the re-condensing section 20 whereupon a portion of the pure vapor exits at 22. Another portion of the vapor is transported via line 24 to an ejector 26. High pressure working fluid previously pressurized by a pump 28 and thereafter heated by a heat source 30 via heat exchanger 32 enters the ejector 26 through the transfer pipe 34 to pressurize the working fluid which has entered from pipe 24 and thus are propelled together at the required pressure through pipe 36 to the re-boiler heat exchanger 38 contained in the bottom of vessel 12.

As shown in FIG. 1, the compression apparatus takes the form of a jet pump or ejector 26, structural forms of which are well known in the art and generally involves the utilization of a major stream entering by pipe 34 to accomplish pressurization of flow of secondary stream entering the ejector 26 through pipe 24. More specifically, the ejector 26 receives the power stream from the heat exchanger 32 through line 34 actuate the incoming stream through line 24. The two intake streams are merged in a single exhaust stream that is carried through line 36. In the re-boiler heat exchanger 38, the fluid in the form of a gas entering through line 36 is condensed to a liquid thus giving up its heat of vaporization and exits from the re-boiler 38 as a liquid at point 40. A portion of the liquid working fluid is diverted at point 42 whereby it is transferred through pipe 44 to the pump 28 so as to be eventually employed in the ejector 26. The balance of the liquid working fluid proceeds to a heat exchanger 46 whereby the liquid is further cooled prior to its expansion through valve 48 so as to more efficiently reflux the separation process, i.e., provide liquid to flow downward through the vessel 12. The working fluid which is condensed in the re-boiler 38 provides the required heat to vaporize a portion of liquid contained in the re-boiler section 18 and thus afford a vapor upflow through the vessel 12. The balance of the liquid in the re-boiler section 18 is exhausted as the bottom product from pipe 50. The ejector 26 increases the pressure of the working fluid so as to afford the required thermodynamic condition for its condensing in the re-boiler 38.

Recapitulating to some extent what is described is a more efficient heat powered loop denoted as P, separation process, denoted by loop S; whereby the correct thermodynamic conditions are provided to the working fluid so as to efficiently carry out a separation of the fluid mixture in the vessel 12. The separation loop is known in the art as a rectification or distillation column and consists of the vessels 12, re-boiler heat exchanger 38, and packing 14. The working fluid as shown in FIG. 1 consists of the composition of the vapor at the top of vessel 12 and is utilized as described in both the power loop P and separation loop S.

Generally, the system of FIG. 1 is relatively inexpensive to construct and in spite of that consideration may be designed to attain a reasonably high level of efficiency. However, in some situations, it may be desirable to employ a more elaborate system in the interest of substantially increased efficiency. Such a system is shown in FIG. 2 and will now be considered in detail.

Figure 2:
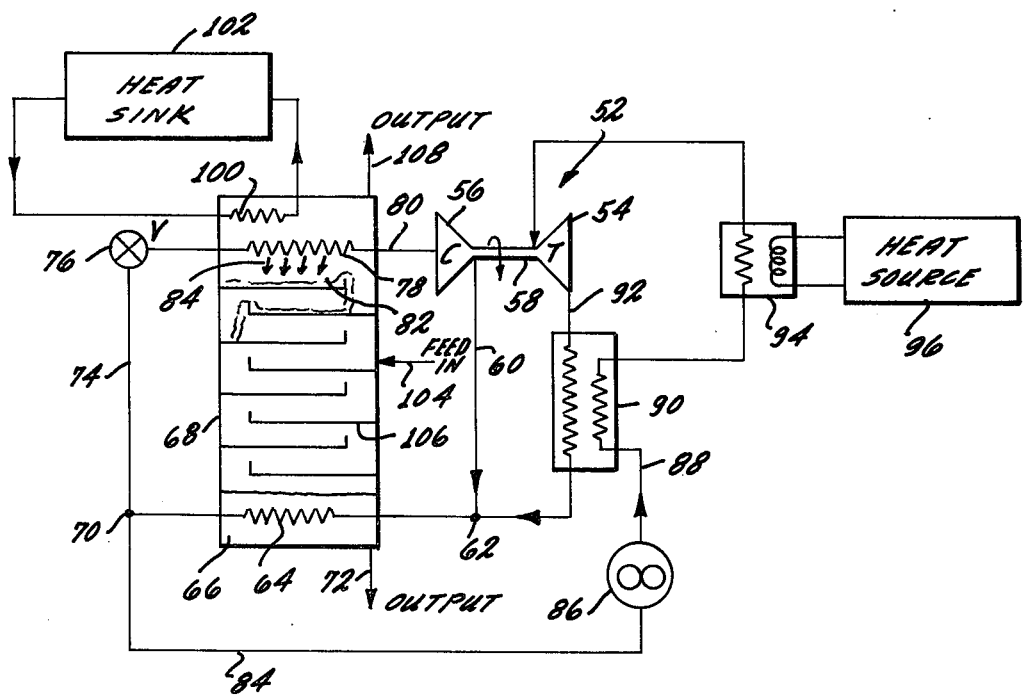
FIG. 2 is a schematic diagram of another system constructed in accordance with the present invention relating to a more sophisticated form for improved performance.

Generally, the operation of the system of FIG. 2 is somewhat similar to that of FIG. 1. The major distinction between the two systems is that the system of FIG. 2 employs a turbo-compressor unit 52 which is driven by the power loop to provide the compression function for the separation loop. Specifically, the turbo-compressor 52 includes a turbine 54, mechanically coupled to a compressor 56. The turbine 54 and the compressor 56 may be carried on a common shaft 58, supported on fluid bearings as well known in the prior art for efficient operation.

The compressor 56 provides working fluid at an elevated pressure in an exhaust 60 which is connected through a junction 62 to a re-boiler heat exchanger 64 that is positioned within the liquid phase 66 contained in the bottom of the distillation column 68. Due to the thermodynamic properties of the working fluid used, the working fluid entering the re-boiler 64 at the pressure generated by the compressor 56 will condense and thus exit at point 70 in the liquid state. In the process of condensing the latent heat given up is such as to evaporate a portion of the liquid phase fluid 66 so as to provide an upward flow of vapor through the distillation column 68. The balance of the liquid phase fluid 66 exhausts at point 72 as the bottom product output. At the junction 70, a portion of the liquified working fluid is transferred by pipe 74 to the expansion valve 76 where its pressure is reduced so as to further cool the liquid working fluid and also change its thermodynamic state so that upon passage through the reflux condensing heat exchanger 78 it is evaporated thus absorbing heat and exits at point 80 in a gaseous state. During the re-fluxing heat exchange some of the vapor 82 rising up through the column 68 is liquified to provide the re-flux liquid 84 which in turn flows downward toward through the column 68. The gaseous working fluid transported by pipe 80 then proceeds to the compressor 56 thus completing the working fluid's journey through the separation loop S of the given system. It should be noted that by use of the re-flux condenser 78 a completely closed system is obtained whereby the working fluid in the system can be chosen so that its thermodynamic properties are such as to afford the optimum heat transfer situation and thereby accomplish the separation very efficiently. It is noteworthy that such fluids as the well-known fluorinated compounds "Freons," $NH_3$, $SO_2$, light hydrocarbons such as propane, butane; and methylchloride are among the great possiblities of choices. At the junction 70, the remaining portion of the liquid working fluid is directed by pipe 84 to the pump 86 whereupon its pressure is increased. The high pressure working fluid in the liquid state is transported by pipe 88 through the regenerative heat exchanger 90 whereby the high-pressured fluid is heated by the residual heat contained in the turbine's exhaust 92. The high-pressure prewarmed working fluid is then vaporized in heat exchanger 94 by adding heat from the heat source 96. The heat source 96 may take the form of any of a wide variety of forms, such as electric heaters, steam, and waste heat. Upon the passage of the working fluid through the heat exchanger 94 and being fully vaporized it passes as a gas through pipe 98 into the turbine 54 which in turn drives compressor 56 through shaft 58.

The approximate amount of the total heat added by means of the heat source 96 is rejected from the system by an auxilliary reflux heat exchanger 100 located in top of the distillation column 68. This heat rejection is accomplished through a heat sink 102 and usually takes the form of cooling water. The auxiliary reflux heat exchanger 100 serves to condense a portion of the rising vapor in the column and thus supply additional liquid reflux which flows downward through the distillation column 68. The fluid mixture feed to be separated enters the column 68 at the appropriate location 104 and the liquid portion if there is any present flows downward while the gaseous portion of the feed input flows upward through the column 68. The separation of the fluid input feed is accomplished by the thermodynamic equilibrium principles well established in the art of separation by distillation or rectification and can be accomplished by means of bubble cap trays 106. Other well-known column mechanisms such as valve trays, seive trays, or packing can be employed. The heavier component exhausts at point 72 as the bottom output while the lighter component exhausts at the top output 108.

Figure 3:
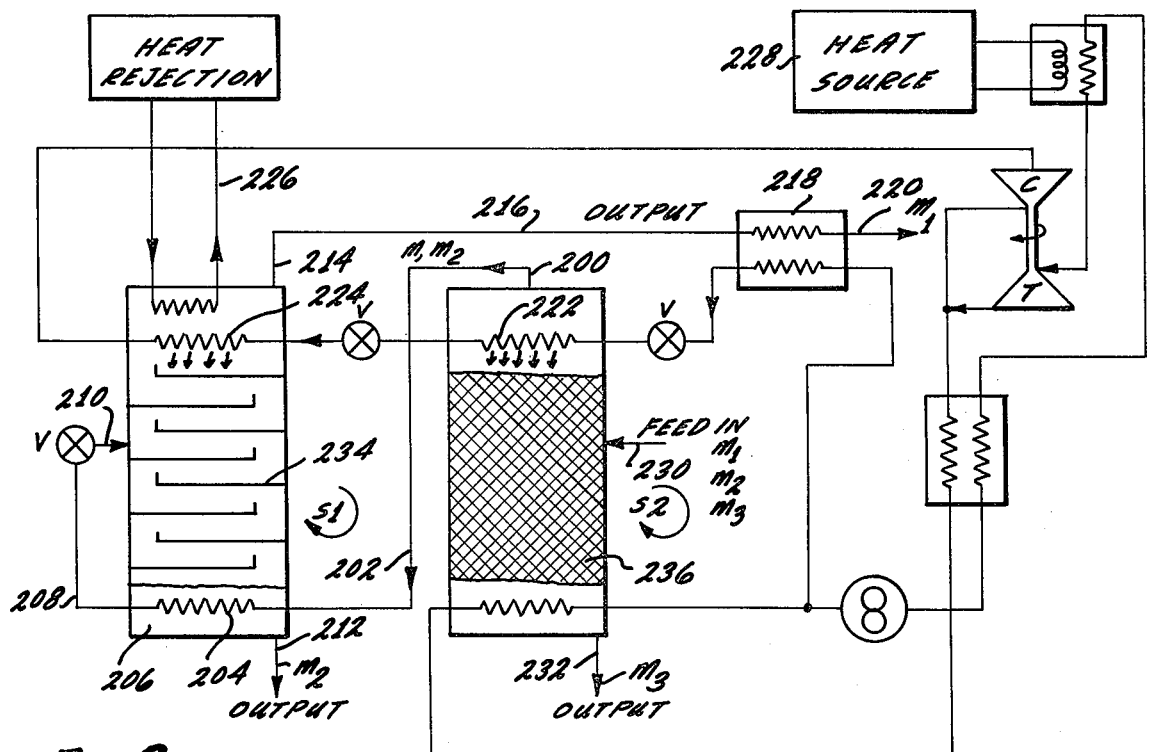
FIG. 3 is a schematic diagram of a composite system constructed in accordance with the present invention more specifically relating to a multicomponent separation.

To obtain the separation of a multicomponent fluid mixture feed the system of the present invention may be incorporated in the multiple-stage apparatus. Specifically referring to FIG. 3 a two-separation system S1 and S2 as disclosed above are represented. Specifically, the two system may take a form identical to that disclosed in FIG. 2 and in that regard, the top output product 200 consisting of the products mixture $M_1$ and $M_2$ is transferred by pipe 202 to the re-boiler exchanger 204 of separation system S1 where it is in turn liquified thus affording the heat for re-boiling in the bottom section 206. The liquid feed 208 is then fed into separation column S1 at the correct position 210. Separation column S1 then separates this liquid input feed 210 into its pure components whereby the heavier pure component $M_2$ exhausts at point 212 and the lighter pure component $M_1$ exhausts at the top 214. The exhaust component $M_1$ is transported through pipe 216 to regenerative heat exchanger 218 where it is heated prior to its exhaust from the total system at point 220. Regenerative heat exchanger 218 provides precooling to the working fluid which in turn is used to reflux separation column S2 in reflux heat exchanger 222 and separation column S1 in reflux heat exchanger 224. The heat rejection loop 226 provides the added required reflux in separation column S1 and also is the means for rejecting the added heat supplied by the heat source loop 228 from the total system. In like manner, the total input feed mixture consisting of components $M_1$, $M_2$, and $M_3$ enters separation column S2 at point 230 where it is separated into a pure bottom output $M_3$ which exhausts at point 232. As shown in FIG. 3, the working fluid loop is similar to that described in FIG. 2.

For generality, FIG. 3 shows a tray column S1 containing separation trays 234 while separation column S2 contains an appropriate column packing 236. It is readily apparent that both separation columns may contain separation trays or packing depending upon the requirements of a given separation process.

Figure 4:
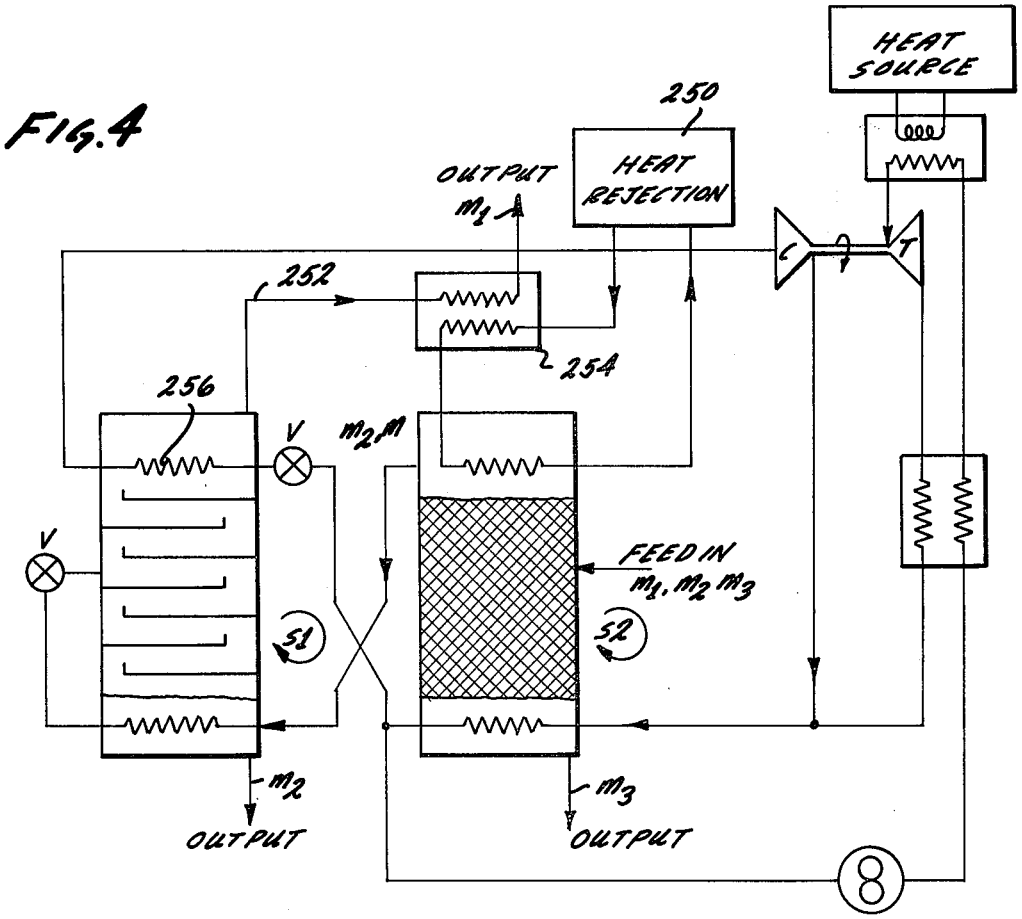
FIG. 4 is a schematic diagram of an alternate composite system constructed in accordance with the present invention more specifically relating to a multicomponent separation.

FIG. 4 shows an alternate to the multi-stage separation system as shown in FIG. 3 whereby all of the reflux in separation column S2 is supplied by the heat rejection loop 250 which in turn is pre-cooled by the exhaust top product output 252 in regenerative heat exchanger 254. In this example, all of the reflux for separation column S1 is provided by the working fluid in reflux condenser 256. As shown in FIG. 4, the working fluid loop is similar to that described in FIG. 2.

Of course, various other modifications and changes in the system as disclosed herein will be readily apparent to those skilled in the art. As a consequence, the scope hereof shall be deemed to be in accordance with the claims as set forth below.

What is claimed is:

1. A combined power loop and rectification type separation system for the separation of multicomponent mixtures by heat energy comprising:
   means comprising at least one vessel receiving an input mixture to be separated by liquid and vapor phase equilibrium phenomenon,
   said vessel including a lower portion forming a reboiler section containing a liquid and an upper portion forming a refluxing section containing a gas and a portion therebetween containing liquid-gas contacting means,
   means to remove output products from said reboiler section and said refluxing section of said vessel,
   working fluid means in heat transfer relationship with said vessel for supplying, adsorbing and transporting the required heat energy by a phase change of the working fluid to carry out the separation,
   means to introduce said working fluid in gaseous form into said reboiler section to effect condensation of said gas thereby producing heat to vaporize at least a portion of the liquid to the reboiler section,
   means to remove condensed working fluid from the reboiler section,
   means receiving at least a portion of the condensed working fluid from said reboiler section and to pressurize the same,
   means receiving and heating said pressurized condensed working fluid in liquid form to convert said working fluid from liquid form to gaseous form thereby to provide a power source for compressor means,
   compressor means receiving said power source working fluid and working fluid in gaseous form from the refluxing section of said vessel to provide a compressor output working fluid in gaseous form for flow into said reboiler section of said vessel for condensation thereof to liquid form,
   means receiving at least a portion of the condensed working fluid from said reboiler section to provide refluxing fluid to the refluxing section of one of said vessel and a refluxing section of said means receiving an input mixture to be separated, and
   heat rejection means to cool said refluxing fluid prior to entrance thereof into the refluxing section of one of said vessel, and a refluxing section of said means receiving an input mixture to be separated.

2. A combined power loop and rectification type separation system as set forth in claim 1 wherein said reboiler section includes a reboiler heat exchanger having a heat transfer surface to effect condensation of said gaseous working fluid thereby to produce heat to vaporize at least a portion of the liquid in the reboiler section.

3. A combined power loop and rectification type separation system as set forth in claim 2 wherein said reflux section includes a refluxing heat exchanger for providing a heat transfer surface to effect condensation of at least a portion of the output products to provide refluxing fluid in the reflux section of said vessel.

4. A combined power loop and rectification type separation system as set forth in claim 3, wherein said working fluid is of a composition different from said input mixture and said output products.

5. A combined power loop and rectification type separation system as set forth in claim 4 wherein said compressor means is comprised of a compressor driven by a turbine,
   means to flow the working fluid from said reflux heat exchanger into said compressor,
   means to flow said working fluid in gaseous form forming the power source to said turbine to provide a working fluid output for flow into said reboiler section of said vessel for condensation thereof to liquid form, and
   said heat rejection means being a heat exchanger to cool a portion of the output product fluid flowing to said refluxing section from said reboiler section and thus provide refluxing fluid in said reflux section of said vessel.

6. A combined power loop and rectification type separation system as set forth in claim 5 further including heat exchanger means for transferring heat from said compressor output working fluid leaving said compressor means to the working fluid flowing from said pressurizing means to said means for receiving and heating said pressurized condensed working fluid.

7. A combined power loop and rectification type separation system as set forth in claim 1 wherein said compressor means is an ejector,
   said working fluid being a portion of the product removed from said refluxing section,
   means to introduce a portion of the product removed from said refluxing section into said ejector,
   means to flow said power source working fluid to said ejector to provide an ejector output working fluid for flow into said reboiler section of said vessel for condensation thereof to liquid form, and
   said heat rejection means being a heat exchanger to cool the portion of the condensed working fluid flowing to said refluxing section from the reboiler section.

8. A combined power loop and rectification type separation system as set forth in claim 1 wherein said compressor means is a compressor comprising a compressor driven by a turbine,
   means to flow the working fluid from said refluxing into said compressor, and means to flow said working fluid in gaseous form forming the power source to said turbine to provide a working fluid output for flow into said reboiler section of said vessel for condensation thereof to liquid form and to cool the portion of the condensed working fluid flowing to said refluxing section from said reboiler section.

9. A combined power loop and rectification type separation system as set forth in claim 1 further including heat exchanger means for transferring heat from said compressor output working fluid leaving said compressor means to the working fluid flowing from said pressurizing means to said means for receiving and heating said pressurized condensed working fluid.

10. A combined power loop and rectification type separation system as set forth in claim 1 wherein said working fluid is the product removed from the refluxing section of said vessel.

11. A combined power loop and rectification type separation system as set forth in claim 1 wherein said means receiving said input mixture includes a second vessel having a lower portion forming a reboiler section and an upper portion forming a refluxing section and a portion therebetween containing liquid-gas contacting means,
means flowing the output product of the refluxing section of said vessel to the reboiler section of said second vessel, said output product of the refluxing section of said vessel being gaseous in form and being condensed in the reboiler section of said second vessel thereby producing heat to vaporize at least a portion of the liquid in the reboiler section of said second vessel.

12. A combined power loop and rectification type separation system as set forth in claim 11 wherein said second vessel includes a refluxing heat exchanger in said refluxing section and a reboiler heat exchanger in said reboiler section,
said compressor means comprising a compressor driven by a turbine,
means to flow at least a portion of the working fluid from the reboiler section of said vessel to said turbine, and
means to flow the working fluid from the refluxing section of said second vessel to the compressor.

13. A combined power loop and rectification type separation system as set forth in claim 1 wherein said working fluid flows in a closed loop.

14. A combined power loop and rectification type separation system as set forth in claim 1 wherein said compressor means is an ejector.

* * * * *